Patented Dec. 4, 1934

1,983,030

UNITED STATES PATENT OFFICE 1,983,030

SOUND RECORD AND PROCESS OF PREPARING SAME

Willy O. Herrmann, Munich, Germany, assignor, by mesne assignments, to Chemische Forschungsgesellschaft, m. b. H., Munich, Germany, a corporation of Germany No Drawing. Application June 2, 1931, Serial No. 541,690. In Germany June 7, 1930

12 Claims. (Cl. 106—22)

Flexible records have been known for some time. Essentially they are manufactured from cellulose esters, especially cellulose acetate or nitrocellulose. Besides several advantages, especially mechanical strength, these records have a large number of disadvantages in respect of manufacture. For instance the sheets for the records must be cut from films prepared by circumstantial operations. Since they do not flow under the heated press the process of manufacture is very inconvenient and runs very slowly. Besides, the defective pieces or the cutting wastes etc. are of little or no value because they cannot be carried back immediately into the manufacture. For these reasons the costs of manufacture are increased. Furthermore records made from nitrocellulose are inflammable. Similar difficulties are met when using these cellulose esters for the manufacture of other moulded articles.

I have found that these difficulties of manufacture and the disadvantages can be removed or diminished and that the costs of manufacture can be largely reduced while preserving the advantage of mechanical strength. This progress is achieved by adding as a component to the cellulose esters a polymerized vinyl ester and if necessary suitable softening means etc. By this way also the circumstantial and expensive intermediate manufacture of sheets for the records is avoided. The new process starts immediately from cellulose esters of any form, for instance from powder, chips or also solutions. By this way also the waste which was more or less useless in the processes known hitherto can be immediately used again.

Advantageously the polymerized vinyl esters are combined with the other materials in presence of a solvent. By controlling the quantity and kind of the polymerized vinyl ester and its degree of polymerization especially in view of the controlled kind and quantity of the cellulose ester the desired amount of fluidity of the masses can be achieved. The quantity of the polymerized vinyl esters may vary according to the degree of polymerization. Generally from 10 to 90% of the polymerized vinyl esters are suitable.

The following examples illustrate some of the many ways of carrying out my process. The quantity, the additional substances, the quality of cellulose esters and vinyl esters may be varied between wide limits. Parts are by weight.

Example I

In a kneading apparatus to 550 parts of a 30 per cent solution of highly viscous polymerized vinyl acetate in acetone 370 parts of highly viscous cellulose acetate are added. While mixing the components, 50 parts of polymerized vinyl acetate of low viscosity are admixed. When a homogeneous mass is formed it is dried and the solvent is recovered. The dried product in pieces or after suitable pulverization can now be used for moulding purposes. From the powdered or unpowdered mass blank sheets can be pressed for the manufacture of records and other articles and then for example imprinted under a press with sound lines. Also the powdered mass can immediately be pressed to records or moulded articles by means of a suitable matrix.

Also other cellulose esters as for instance nitro cellulose can be combined with polymerized vinyl esters. Besides different modifications of polymerized vinyl acetate also the esters of higher carboxylic acids as for instance polymerized vinyl butyrate can be used.

The masses combined from cellulose esters and polymerized vinyl esters may be modified according to the different purposes in any possible manner. They may be used in a suitable way for the manufacture of clear transparent or translucent records. They can also be mixed with fillers, pigments and other substances as cotton flocks, mineralic or organic dye-stuffs or other specifical ingredients. For instance substances enlarging the tensile strength as cellulose, or for records, substances influencing the reproduction of sound are added. For electrical purposes additions influencing the electric qualities may be applied. Such additions may be incorporated in a suitable manner during the manufacture of the ground mass.

Example II

In a kneading apparatus 1250 parts of a 40 per cent paste of high viscous polymerized vinyl acetate in commercial ethyl alcohol are mixed with 200 parts of a high viscous nitrocellulose paste in alcohol containing 100 parts of nitrocellulose and 100 parts of alcohol. To this mixture are added 200 parts of shellac orange T. N., 600 parts of slate dust, 300 parts of micro-asbestos, 300 parts of heavy spar and 30 parts of carbon black. The mixing process is continued until a homogeneous mass is formed. This mass is dried in a suitable drying apparatus, the dried product pulverized and then use for the manufacture of records and other moulded articles.

In the foregoing example instead of 1250 parts of the polymerized vinyl acetate paste 1500 parts of a 30 per cent solution of polymerized vinyl butyrate may be used.

Example III

In a kneading apparatus 2000 parts of a 40 per cent paste of high viscous polymerized vinyl acetate in alcohol are mixed with 400 parts of a 20 per cent solution of cellulose acetate of medium viscosity in acetone. To this mixture are added 66 parts of dimethylphthalate, 450 parts of cellulose, 200 parts of magnesia and 270 parts of shellac orange T. N. This batch is treated and used as described in Example II.

Records of any kind can be manufactured from the materials thus obtained as for instance round records, pictorial post cards and so on. Naturally also thin sheets can be pressed from the material and can be combined by intermediate layers of another material. The sheets may be combined for instance by sticking. By this way transparent records with words or pictures, advertisements, post cards can be manufactured.

In connection with my invention and the various examples given I wish to be understood that I do not confine myself to all the precise proportions or to the details herein set forth by way of illustration, as modifications and variations may be made as conditions may require or it may be deemed desirable, for example variations of the kind and the proportion of quantity as well of the polymerized vinyl ester and the cellulose ester as the quantity and kind of the additional substances as softeners, mineralic and organic fillers, pigments, colours, resins as the manner of combining them and so on are possible.

What I claim is:

1. A record having sound grooves comprising a composition containing a polymerized vinyl ester and a cellulose ester.

2. A record having sound grooves comprising a composition containing a polymerized vinyl ester, a cellulose ester, and a softener.

3. A record having sound grooves comprising a composition containing a polymerized vinyl ester, a cellulose ester, and a filler.

4. A record having sound grooves comprising a composition containing a polymerized vinyl ester, a cellulose ester, a resin, and a filler.

5. A record having sound grooves comprising a composition containing a polymerized vinyl ester, a cellulose ester, and cellulose.

6. A record having sound grooves comprising a composition containing a polymerized vinyl ester, a cellulose ester, cellulose, and an inorganic filler.

7. A record having sound grooves comprising a composition containing a polymerized vinyl ester, a cellulose ester, cellulose, and a resin.

8. A record having sound grooves comprising a composition containing a polymerized vinyl ester, a cellulose ester, cellulose, and a softener.

9. A record having sound grooves comprising a composition containing polymerized vinyl acetate, cellulose acetate, cellulose, a softener, a resin, and an inorganic filler.

10. A record having sound grooves comprising a composition containing polymerized vinyl acetate, nitrocellulose, a resin, and an inorganic filler.

11. A record having sound grooves comprising a composition containing high viscosity polymerized vinyl acetate, high viscosity nitrocellulose, a resin, an inorganic filler, and carbon black.

12. A record having sound grooves comprising a composition containing separately prepared high and low viscosity polymerized vinyl ester and a cellulose ester.

WILLY O. HERRMANN.